United States Patent
Perlman

(10) Patent No.: US 8,556,997 B2
(45) Date of Patent: Oct. 15, 2013

(54) FUEL COMPOSITIONS AND FUEL THICKENERS, INCLUDING MONOGLYCERIDES

(75) Inventor: Daniel Perlman, Arlington, MA (US)

(73) Assignee: Perlman Consulting, LLC, Arlington, MA (US)

( * ) Notice: Subject to any disclaimer, the term of this patent is extended or adjusted under 35 U.S.C. 154(b) by 0 days.

(21) Appl. No.: 13/205,026

(22) Filed: Aug. 8, 2011

(65) Prior Publication Data

US 2013/0040249 A1 Feb. 14, 2013

(51) Int. Cl.
*C10L 1/18* (2006.01)

(52) U.S. Cl.
USPC ............................................. 44/272; 44/388

(58) Field of Classification Search
USPC ........................................... 44/272, 308, 388
See application file for complete search history.

(56) References Cited

U.S. PATENT DOCUMENTS

| | | | |
|---|---|---|---|
| 3,672,854 A * | 6/1972 | Rosenwald | 44/349 |
| 4,012,205 A | 3/1977 | Cohen et al. | |
| 5,858,031 A | 1/1999 | Perlman | |
| 6,755,877 B2 | 6/2004 | Perlman | |
| 2011/0107947 A1 | 5/2011 | Vernon | |

OTHER PUBLICATIONS

Aerosil Web Page, last accessed Aug. 8, 2011, at http://www.aerosil.com/product/aerosil/en/products/hydrophilic-fumed-silica/pages/default.aspx.

* cited by examiner

*Primary Examiner* — Cephia D Toomer
(74) *Attorney, Agent, or Firm* — McLane, Graf, Raulerson & Middleton, PA

(57) ABSTRACT

Various aspects of the present invention generally relate to the field of rheologically modified fuels, including hydrocarbon, hydrophobic, and/or liquid fuels such as alkane-based odorless mineral spirits, paraffin oil and biofuels such as monoalkyl esters of medium to long chain ($C_8$-$C_{18}$) fatty acids, that have been thickened or gelled, e.g., by precipitation of fatty acid monoglycerides such as glyceryl monostearate and glyceryl monopalmitate. A thickened fire lighting fuel composition is described in some embodiments which includes a hydrocarbon- or alkyl ester-based hydrophobic liquid fuel, and an effective amount of at least one saturated fatty acid monoglyceride. The monoglyceride may be thermo-precipitated in certain instances in the fuel composition causing a substantial increase in the viscosity of the fuel composition.

9 Claims, No Drawings

FUEL COMPOSITIONS AND FUEL THICKENERS, INCLUDING MONOGLYCERIDES

FIELD OF THE INVENTION

Various aspects of the present invention generally relate to the field of rheologically modified fuels, including hydrocarbon, hydrophobic, and/or liquid fuels such as alkane-based odorless mineral spirits, paraffin oil and biofuels such as mono-alkyl esters of medium to long chain ($C_8$-$C_{18}$) fatty acids, that have been thickened or gelled, e.g., by precipitation of fatty acid monoglycerides such as glyceryl monostearate and glyceryl monopalmitate.

BACKGROUND OF THE INVENTION

The following discussion is provided solely to assist the understanding of the reader, and does not constitute an admission that any of the information discussed or references cited constitute prior art.

Mineral spirits (CAS Reg. No. 64475-85-0) are petroleum distillates derived from the light distillate fractions during the crude oil refining process, and are generally composed of six to eleven carbon ($C_6$-$C_{11}$)-containing alkane hydrocarbon compounds (though small amounts of other compounds may be present), with the majority of the mass composed of $C_9$-$C_{11}$ alkanes. Mineral spirits are commonly used as a paint thinner and mild solvent. In industry, mineral spirits are used in conjunction with cutting oil, and for cleaning and degreasing machine tools and parts.

Odorless Mineral Spirits (hereinafter abbreviated "OMS"), e.g., CAS Reg. Nos. 8052-41-3 or 64742-48-9, are petroleum-derived mineral spirits that have been further refined to remove toxic aromatic compounds including benzene and toluene, and are often recommended for applications where humans have close contact with the solvent, including oil painting, ink printing and addition to barbecue charcoal as an easily ignited lighter fuel. OMS has an initial boiling point of about 340 F (171-178° C.) and a specific mass of about 0.76 g/cc.

Paraffin oil is a petroleum hydrocarbon oil that is also known as mineral oil. It is available in both light and heavy grades. Paraffin oil is also known as white mineral oil or liquid paraffin, e.g., CAS Reg. No. 8012-95-1 and CAS Reg. No. 8042-47-5. The oil is routinely refined to clarity, having little color or odor. Paraffin oil is principally composed of n-alkane molecules containing fifteen to forty carbon atoms ($C_{15}$-$C_{40}$). The oil has a number of uses including use as a lubricant or as a fuel for oil lamps and liquid candles (e.g., paraffin lamp oil from Lamplight, Inc., Menomonee Falls, Wis.).

Consideration is also given to hydrophobic non-petroleum fuels such as medium to long chain ($C_8$-$C_{18}$) fatty acid ester fuels such as biodiesel fuel. Biodiesel fuel can be used in standard diesel engines, and is thus distinct from vegetable and waste oils used to fuel converted diesel engines. Biodiesel can be used alone (termed "B100 fuel"), or blended with petroleum hydrocarbon fuels (e.g., B20 containing 20% biodiesel+80% petroleum diesel fuel). Blends of less than 20% biodiesel can be used in diesel equipment with no, or only minor, modification. Biodiesel can also be used as an alternative to petroleum-based heating oil.

Fatty acid esters contain alkyl chains of varying length, e.g., $C_4$-$C_{18}$ that may be esterified to methyl, ethyl or propyl moieties. Fatty acid methyl esters have been assigned standard CAS registration numbers based upon the number/range of carbon atoms in their fatty acids as follows: $C_6$-$C_{12}$, CAS Reg. No. 67762-39-4; $C_{10}$, CAS Reg. No. 110-42-9; $C_{12}$, CAS Reg. No. 111-82-0; $C_{12}$-$C_{18}$, CAS Reg. No. 68937-84-8; and $C_{16}$-$C_{18}$, CAS Reg. No. 85586-21-6. Fatty acid methyl esters are aliphatic organic esters primarily prepared by the reaction of carboxylic fatty acids derived from natural fats and oils and methanol in the presence of a base catalyst. The resulting esters can be subsequently processed into various alkyl range cuts by fractional distillation. Fatty acid methyl esters are used extensively as intermediates in the manufacture of detergents, emulsifiers, wetting agents, stabilizers, textile treatments, and waxes, among other applications. Lesser volumes of fatty acid methyl esters are used in a variety of direct and indirect food additive applications, including the dehydration of grapes to produce raisins, synthetic flavoring agents, and in metal lubricants for metallic articles intended for food contact use. Fatty acid methyl esters are also used as intermediates in the manufacture of a variety of food ingredients.

Easily ignited liquid and gelled fuels known as lighter fluids or starter fuels, including odorless mineral spirits (OMS), gelled alcohol and waxes, for example, have been used for many years to initiate combustion of more difficult to ignite regular fuels including fireplace logs, barbecue charcoal, coal, and pellet fuels, for example.

By contrast, OMS charcoal lighter fluid has dominated the marketplace and has been sold for many years by a number of companies including the Kingsford Products Company (Oakland, Calif.), Royal Oak Enterprises, LLC (Roswell, Ga.), Reckitt and Coleman (Wayne, N.J.) and Duraflame Inc. (Stockton, Calif.). Directions on the Kingsford product suggest that an amount of OMS fluid equal to approximately 10% the weight of the charcoal should be applied to the charcoal (1.6 fluid oz per pound of charcoal). Therefore, a quart of the fluid is sufficient to light approximately one 20 lb. bag of charcoal.

The use of flammable liquids for starting fires from fuels such as charcoal, wood, and coal has been commonly practiced for many years. However, the flammable liquids most often used for such applications have significant limitations and drawbacks.

SUMMARY

Various aspects of the present invention provide, inter alia, advantageously modified hydrophobic fuels which are thickened by the addition of agents containing fatty acid monoglycerides, for example, fatty acid monoglycerides such as monoglycerides having $C_{14:0}$, $C_{16:0}$, and $C_{18:0}$ fatty acids. Such modified fuel compositions are, for example, useful for lighting charcoal fires, such as in charcoal grills.

One aspect of the invention provides a fuel composition which includes at least one hydrophobic liquid and an effective amount of at least one saturated fatty acid monoglyceride agent. In some cases, the monoglyceride agent is precipitated in the hydrophobic liquid to cause thickening of the fuel composition.

In certain embodiments, the monoglyceride agent has been heated and dissolved with at least a portion of the hydrophobic liquid before being cooled and precipitated in the composition; the liquid is a hydrocarbon- or fatty acid ester-based hydrophobic liquid, and/or the hydrophobic liquid is combustible; the monoglyceride agent contains predominantly saturated fatty acid monoglycerides; the monoglyceride agent contains predominantly saturated fatty acid monoglycerides and does not contain a significant level of fatty acid di- or tri-glycerides; the monoglyceride agent contains a combination of saturated fatty acid monoglycerides and disaturated fatty acid diglycerides; the monoglyceride agent contains a combination of saturated fatty acid monoglycerides and disaturated fatty acid triglycerides; and/or the monoglyceride agent contains a combination of saturated fatty acid monoglycerides, disaturated fatty acid diglycerides, and trisaturated fatty acid triglycerides.

In particular embodiments, for any of the agents described above or otherwise described herein, the composition includes 1-15%, 2-15%, 3-15%, 5-15%, 1-12%, 2-12%, 3-12%, 4-12%, 5-12%, 7-12%, 1-10%, 2-10%, 3-10%, 4-10%, 2-8%, 2-6%, 3-8%, 3-6%, 3-5%, 4-8%, or 4-6% by weight of the agent; the combustible hydrophobic liquid is or includes an aliphatic hydrocarbon liquid, for example, an alkane hydrocarbon liquid, odorless mineral spirits, or paraffin oils; the hydrophobic liquid is or includes an fatty acid alkyl ester hydrophobic liquid, for example, a fatty acid mono-alkyl ester liquid such as a liquid in which some, most, or substantially all of the fatty acid esters (e.g., at least 40%, at least 50%, at least 60%, at least 70%, at least 80%, or at least 90% of the fatty acid molecular moieties) are fatty acid mono-methyl esters, fatty acid mono-ethyl esters, and/or fatty acid mono-propyl esters, or a combination thereof, where in certain beneficial cases some, most, or substantially all (e.g., at least 40%, at least 50%, at least 60%, at least 70%, at least 80%, or at least 90% of the fatty acid molecular moieties contain 18 or fewer, 16 or fewer, or 14 or fewer carbon atoms. In certain cases, at least 40%, at least 50%, at least 60%, at least 70%, at least 80%, or at least 90% by weight of the monoglyceride agent is glycerol monostearate or a mixture of glyceryl monostearate and glyceryl monopalmitate.

In particular embodiments, the agent also contains at least one saturated fatty acid-containing diglyceride, e.g., glyceryl distearate, glyceryl dipalmitate, glyceryl palmitostearate and/or combinations thereof; the agent also contains a fat that is solid at room temperature, for instance, containing trisaturated triglycerides, e.g., tristearin, tripalmitin, palmitodistearin, stearodipalmitin, and/or combinations thereof; and/or the agent also contains at least one saturated fatty acid-containing diglyceride (e.g., as just listed above) and/or at least one trisaturated triglyceride (e.g., as just listed above). Another aspect of the invention provides a method of thickening a hydrophobic fuel, a combustible fuel, and/or a liquid fuel. The method involves, in some cases, cooling a solution containing a hydrophobic liquid with an effective amount of at least one saturated fatty acid monoglyceride agent dissolved therein, e.g., from above the precipitation temperature for that agent to below the precipitation temperature of that agent in the hydrophobic liquid, thereby forming a thickened or gelled fuel. In some cases, the hydrophobic liquid may be a hydrophobic liquid fuel.

In certain embodiments, the monoglyceride agent is dissolved in the hydrophobic liquid at a temperature above the precipitation temperature for the agent in the particular hydrophobic liquid; the monoglyceride agent is dissolved in the hydrophobic liquid under conditions of temperature, mixing, and physical form of the monoglyceride agent that the agent is fully dissolved in the liquid within 5 seconds, 10 seconds, 15 seconds, 20 seconds, 30 seconds, or 60 seconds, or with 2 minutes, 3 minutes, or 5 minutes of combining the agent and the liquid; the monoglyceride agent is added to the hydrophobic liquid in the form of a melt; the monoglyceride agent is added to the hydrophobic liquid as a solid (the use of small particles, e.g., flakes, small irregular chunks, or solidified droplets may be beneficial to reduce dissolution time, in some embodiments); immediately before the rapid cooling, the hydrophobic liquid with the monoglyceride agent dissolved therein is at a temperature at least 1° C., 2° C., 3° C., 4° C., 5° C., 7° C., or 10° C. or is in a range of 1-10° C., 1-5° C., 2-10° C., 2-7° C., 5-10° C., or 5-15° C. above the precipitation temperature of the agent in the hydrophobic liquid; immediately before the rapid cooling, the hydrophobic liquid with the monoglyceride agent dissolved therein is at a temperature of at least 60° C., 61° C., 62° C., 63° C., 64° C., or 65° C. or is in a range of 60-65° C., 63-68° C., 65-70° C., or 65-75° C.; and/or the monoglyceride agent is added to the hydrophobic liquid at a temperature no more than 10° C., 7° C., 5° C., 4° C., 3° C., 2° C., or 1° C. below the solvent-free melting temperature of the agent (and may be at a temperature above the solvent-free melting temperature of the agent). The hydrophobic liquid may be a hydrophobic liquid fuel in certain cases.

In some beneficial embodiments, the method includes rapidly mixing a first volume of an agent dissolved in a first hydrophobic liquid with a second volume of a second hydrophobic liquid, thereby forming a mixed hydrophobic liquid. The first and second liquids may be the same or different. The temperature of the mixed hydrophobic liquid may be below the precipitation temperature of the agent in the mixed hydrophobic liquid; in some cases, the first volume is less than the second volume, e.g., no more than 0.01, 0.02, 0.05, 0.07, 0.10, 0.15, 0.20, 0.25, 0.30, or 0.40 times the second volume. The first hydrophobic liquid may be a hydrophobic liquid fuel, and/or the second hydrophobic liquid may be a hydrophobic liquid fuel.

In particular embodiments, from 1 to 49 parts by weight of the first hydrophobic liquid containing an agent at a temperature above the precipitation temperature of the agent in the first hydrophobic liquid is rapidly mixed with from 51 to 99 parts by weight of the second hydrophobic liquid, thereby forming 100 parts by weight of the mixed hydrophobic liquid containing from 1 to 10 parts by weight of the agent at a temperature below the precipitation temperature of the agent in the mixed hydrophobic liquid; and/or from 2 to 25 parts by weight of the first hydrophobic liquid containing the agent at a temperature above the precipitation temperature of the agent in the first hydrophobic liquid is rapidly mixed with from 75 to 98 parts by weight of the second hydrophobic liquid, thereby forming 100 parts by weight of the mixed hydrophobic liquid containing from 2 to 5 parts by weight of the agent at a temperature below the precipitation temperature of the agent in the mixed hydrophobic liquid. The first hydrophobic liquid may be a hydrophobic liquid fuel, and/or the second hydrophobic liquid may be a hydrophobic liquid fuel.

In certain embodiments, the agent is or includes glyceryl monostearate, glyceryl monopalmitate, or both; the agent contains monoglyceride (e.g., as just listed) and also contains at least one saturated fatty acid-containing diglyceride (e.g., glyceryl distearate, glyceryl dipalmitate, glyceryl palmitostearate and combinations thereof) and/or the agent also contains a fat that is solid at room temperature containing trisaturated triglycerides (e.g., tristearin, tripalmitin, palmitodistearin, stearodipalmitin, and combinations thereof); the fuel is a hydrocarbon-based liquid fuel, an alkyl ester-based liquid fuel or a combination thereof; the alkyl ester-based liquid fuel may be a fatty acid mono-alkyl ester-based liquid fuel and the agent also includes at least one trisaturated triglyceride component, e.g., containing stearic or palmitic fatty acids or both.

Another aspect provides a method of lighting lump charcoal (e.g., shaped charcoal briquettes or irregular lump charcoal), where the method involves applying an effective amount of a thickened or unthickened fuel composition to a first layer of the lump charcoal, adding a second layer of the lump charcoal on top of the first layer, and igniting the fuel composition on the first layer.

In certain embodiments, the quantity of charcoal in the first and second layers together is at least 1 pound, 2 pounds, 3 pounds, 4 pounds, or 5 pounds of charcoal or 1-3 pounds or 2-4 pounds; the effective amount of fuel composition is 1 to 10 fluid ounces, 1 to 8 fluid ounces, 1 to 6 fluid ounces, 1 to 5 fluid ounces, 2 to 10 fluid ounces, 2 to 8 fluid ounces, 2 to 6 fluid ounces, 3 to 10 fluid ounces, 3 to 8 fluid ounces, or 4 to 10 fluid ounces.

In some cases, the charcoal rests on a non-combustible support such as a grate or support platform (which may be perforated or otherwise include air passage through the support, for example, in a barbecue grill, hibachi, or similar device); the weight amount of the fuel composition which is applied may be approximately 0.05 to 0.15, 0.05 to 0.10, or 0.10 to 0.15 times the weight of the charcoal in certain embodiments.

Additional embodiments will be apparent from the Detailed Description and from the claims.

DETAILED DESCRIPTION

Various compositions and methods described herein enable the thickening and/or gelling of fuel compositions comprising hydrophobic liquids, such as hydrophobic liquid fuels using cost-effective and/or environmentally sustainable agents for this purpose. Among other applications, thickened fuel compositions may be used to initiate the combustion of solid fuels that are more difficult to ignite, including but not limited to charcoal and irregular lump charcoal. The fuel composition may include a hydrophobic liquid. Hydrophobic liquids may comprise fuels, which include, but are not limited to, hydrocarbon fuels such as alkane-based odorless mineral spirits, paraffin oil or mineral oil, and ester-type biofuels such as mono-alkyl esters of long chain fatty acids of animal or vegetable origin (also known as biodiesel fuels). The description below emphasizes, for explanatory purposes, the use and thickening of watery thin hydrocarbon-based "lighter fluid" (also known as Odorless Mineral Spirits, abbreviated "OMS"), but is not limited to that material.

From years of experience lighting barbecue charcoal and wood fires using OMS, Applicant believes that OMS can be improved by thickening the OMS fluid to achieve one or more of the following:

(a) reducing contamination of the hands and the outside of the storage container by OMS liquid;
(b) allowing more uniform application of OMS onto briquettes and irregular lumps of charcoal owing to the visibility of the thickened white coating;
(c) reducing the absorption of OMS into the charcoal allowing easier ignition of surface fuel for a longer time interval following application, and earlier volatilization of undesirable OMS odors from ignited charcoal; and
(d) more efficient ignition of briquettes allowing less fluid to be used per fire.

Typical current directions for use of an OMS lighter fluid call for a generous amount of the fluid to be applied to the charcoal (e.g., 1.6 oz fluid per 16 oz charcoal). Traditional lighter fluid is nearly instantly absorbed, and unless a large amount of the fluid is applied, either the charcoal is difficult to ignite or the fire burns too briefly to ignite the charcoal. By substantially saturating the charcoal with OMS, the fire is more easily ignited and the fuel burns long enough to ignite the charcoal. However, the use of so much OMS (10% by weight of the charcoal) may be considered wasteful, and the charcoal typically continues to emit mineral spirits fuel odors even after grilling of food has commenced. Moreover, much of the heat generated from combustion of the fluid rises away from the charcoal rather than rising into the charcoal to initiate its combustion. The present invention facilitates, in one set of embodiments, various techniques for overcoming these difficulties.

Applicant has now discovered that OMS lighter fluid (as well as other suitable hydrophobic liquids, such as hydrophobic liquid fuels, for example, mineral oil) can beneficially be thickened, in accordance with one set of embodiments, by thermo-precipitating a remarkably small proportion (e.g., 2%, 3%, or 4% by weight) of an agent comprising one or more saturated fatty acid-based monoglyceride within the OMS lighter fluid (and/or other suitable liquid). That is, the monoglyceride can be dissolved in a portion (which may conveniently be a small portion) of OMS fluid (and/or other liquid). The OMS fluid (or other hydrophobic liquid) may be heated in some cases, e.g., to promote dissolution of the monoglyceride. The monoglyceride solution subsequently may be chilled, and in some embodiments rapidly chilled, e.g., by dilution of the mixture into the bulk of the fluid, e.g., at a temperature below the precipitation temperature (often approximately ambient temperature), which may cause thickening of the fluid (and/or other liquid), in some cases essentially instantly. The bulk of the fluid (and/or other liquid) may be set at a temperature sufficiently below the precipitation temperature of the agent in certain embodiments so that the temperature of the mixture is also below the precipitation temperature of the agent. The agent may also be dissolved in some cases in warmed OMS fluid or other hydrophobic liquid (or into a large fraction of bulk liquid), and the OMS fluid or other hydrophobic liquid may be rapidly cooled.

In one set of embodiments, the hydrophobic liquid may be a fuel. The hydrophobic liquid may also be a hydrocarbon-containing liquid in certain embodiments, for example, OMS, or paraffin oil or mineral oil, available commercially in both light and heavy grades. Typically, the fuel is combustible, i.e., the fuel is susceptible to combustion or reaction with oxygen in the air, and often will burn in an open flame when ignited and exposed to the air (i.e., the fuel may be flammable in some cases). In some embodiments, upon contact with a flame from a match (or other ignition source) under ambient conditions, e.g., at room temperature (25° C.) and normal atmospheric pressure (1 atm), a fuel may be ignited. In contrast, some materials, such as cooking oil, will not ignite under ambient temperature and pressure after brief exposure to a match (or other ignition source), although such materials might under more extreme conditions, such as when the oil is heated. Thus, for example, a fuel may have a flash point or a fire point of less than about 90° C., less than about 80° C., less than about 70° C., less than about 60° C., less than about 50° C., or less than about 40° C. in some cases, where the flash point is the lowest temperature at which the material will ignite or combust when exposed to an external ignition source, and the fire point is the lowest temperature at which the material will, after being initially ignited by an external ignition source, continue to burn or combust for at least 5 seconds after exposure and removal of the external ignition source. Typically, the fuel is liquid and flows to conform to the outline of its container, although the fuel may be relatively viscous in some cases (i.e., having a viscosity that is greater than the viscosity of water). The fuel may also be viscoelastic and/or solid in some embodiments. Most, but not all, fuels are inedible, i.e., such fuels are not routinely eaten by people, and consumption of such fuels would result in adverse biological effects, including toxicity, poisoning, liver damage, organ failure, or death. The agent comprising monoglyceride may be dissolved in the hydrophobic liquid in a number of different ways. For example, the agent may be added in solid form to the hydrophobic liquid, which may be warmed sufficiently for dissolution either before or after addition of the agent. In another embodiment, the agent is melted and added to the hydrophobic liquid at a temperature below the precipitation temperature, and then the mixture is heated to dissolve the agent. In yet another method, the agent is melted and added to warmed hydrophobic liquid which is at a temperature above the precipitation temperature of the agent in the hydrophobic liquid. In some cases, the result is that the agent is dissolved in hydrophobic liquid above the precipitation temperature. The agent may be precipitated in some embodiments by cooling, usually rapid cooling, for example by mixing the warmed liquid/agent mixture into a quantity of cooler hydrophobic liquid. This may be performed such that the combination has sufficient quantity and sufficiently cool temperatures so that the combination of the two results in a mixed liquid below the precipitation temperature of the agent.

The ability of various embodiments described herein, including but not limited to fuel compositions containing predominantly glyceryl monostearate and/or glyceryl monopalmitate, to thicken OMS fluid (and/or other liquids or liquid fuels, e.g., fatty acid alkyl ester fuels, mineral oils, etc.) may be useful to solve several problems associated with the prior use of some of these fluids for lighting fires, in certain aspects of the invention. OMS is a low viscosity petroleum liquid that tends to dribble from the aperture of a container and contaminate the outside of the container and one's hands. The compositions disclosed herein, at least in certain cases, has no tendency to dribble, e.g., due to their thickened state. In some embodiments, as outlined above, most of the monoglyceride-gelled or semi-gelled fluid may be retained as a visible coating, e.g., on the surface of the charcoal (or other solid fuel). This visual cue may be particularly obvious in embodiments where the thickener makes the fluid white and opaque, and this visual cue may be used to give a user an immediate indication of where and how much of the composition has been applied. In some cases, the applied fuel composition that is applied to the surface of charcoal briquettes (or other suitable solid fuel), for example, may be more easily ignited for an extended time interval (e.g., in contrast to traditional OMS fluids that have a tendency to disappear from the surface as it is absorbed therein). For example, one set of embodiments is generally directed to gelled compositions that melt at approximately 133° F. As a non-limiting example, the composition may include monoglyceride-thickened mineral spirits. As a newly ignited flame propagates over and through a group of charcoal briquettes (as an illustrative non-limiting example), the composition comprising the monoglyceride gel may melt, and the liquefied fuel may ignite while being absorbed into the surface of the charcoal, e.g., where it can burn and/or ignite nearby charcoal. Thus, the former problem of rapid and/or deep absorption of a traditional liquid lighter fluid such as OMS fluid into charcoal (making initial ignition difficult) can be avoided using certain embodiments of the invention, and/or a smaller quantity of the thickened fuel composition can be applied to the charcoal (and/or another suitable solid fuel), to allow for ignition of the surface.

In terms of the environment and air quality considerations, in some (but not all) embodiments of the invention, the fuel compositions consist essentially of carbon, hydrogen and oxygen atoms that, upon complete combustion, produce water and carbon dioxide. The fuel compositions, in some cases, are free of heavy metals and/or are free of chlorinated and other halogenated compounds that, upon burning, could produce dioxin and other toxic substances. The fuel compositions are expected to meet California and/or Federal Volatile Organic Compounds (VOC) emission standards for charcoal lighter material products in certain embodiments of the invention. Accordingly, the fuel compositions are able to, in some embodiments, produce no more than 0.020 pounds VOC per start according to the California South Coast Air Quality District Rule 1174 Ignition Method Compliance Certification Protocol, dated Feb. 27, 1991, or an equivalent amount under a subsequent Ignition Method Compliance Certification Protocol or alternate protocol. In some cases, the fuel compositions produce no more than 0.01 pounds, or no more than 0.005 pounds VOC per start under the cited protocol.

In some embodiments, during use of the fuel composition, and depending upon the amount of charcoal (and/or other solid fuel) being used, the amount of fuel composition required for lighting a fire may vary, e.g., between approximately 1 and 10 fluid ounces. In some cases, the amount of fuel composition applied to a solid fuel such as charcoal or fireplace wood will vary between 2 fluid ounces and 6 fluid ounces, or between 3 fluid ounces and 5 fluid ounces. In some cases, the quantity of fuel composition can vary between 2-16 fluid ounces, 4-10 fluid ounces, 4-12 fluid ounces, 6-12 fluid ounces, or 6-10 fluid ounces. In certain cases, the quantity of fuel composition is selected to provide at least 10 minutes, 15 minutes, or 20 minutes of burn time.

As indicated above, in some aspects of the present invention, Applicant has discovered that certain hydrophobic liquids such as hydrophobic liquid fuels can be thickened to produce a fuel composition using a remarkably low level, e.g., 2%-4% by weight, of an agent such as described herein, using a simple process for introducing the agent into the liquid, for example, a liquid fuel. In certain embodiments, agents which are predominantly saturated monoglycerides have been found quite effective. Agents containing primarily $C_{16}$ and/or $C_{18}$ fatty acid monoglycerides can be advantageously used in some cases. For example, some agents that have proven to be quite effective are mixtures of $C_{16}$ and $C_{18}$ saturated fatty acid-containing distilled monoglycerides (e.g., glyceryl monopalmitate and/or glyceryl monostearate) or mixed mono- and diglycerides, e.g., prepared from hydrogenated palm oil. With diglycerides as well as monoglycerides, the $C_{18:0}$ and/or $C_{16:0}$ saturated fatty acids may be used in some embodiments. Some of these are commercially available. In some cases, the fatty acids may have higher melting points than glycerides prepared from fats whose fatty acid carbon chains are shorter (e.g., $C_{12:0}$ and $C_{14:0}$) and/or unsaturated (e.g., oleic acid, $C_{18:1}$).

Some commercially-available preparations comprising diglycerides may contain glyceryl dipalmitate, glyceryl distearate and/or glyceryl palmitostearate. In the case of mineral spirits and paraffin oil-based fuels, a monoglyceride that contains low levels of diglycerides can be used in some embodiments alone as an effective thickening and gelling agent, often at a final concentration of approximately 3-5% by weight. In other embodiments, however, other materials may also be present.

As a specific, non-limiting example, a fully hydrogenated palm oil-derived monoglyceride (e.g., Myverol™ 18-04 from Kerry Ingredients and Flavors, Inc., Beloit, Wis.) containing approximately 95% by weight monoglycerides, as essentially glyceryl monopalmitate and glyceryl monostearate, and having a melting point of 66° C., can be conveniently dissolved to produce a 30%-50% by weight solution (e.g., an approximately 10-fold concentrate relative to the final concentration in the fuel composition) of the monoglyceride by combining the Myverol™ 18-04 with an equal weight of OMS and heating the mixture to approximately 65-75° C. Interestingly, this 1:1 mixture has a very sharp melting point, and also dissolves and re-crystallizes within approximately a 1° C. temperature range at 62° C. Subsequently, 1 part by weight of the heat-solubilized 50% by weight Myverol™ 18-04 solution (at 65-75° C.) can be admixed and dispersed (using rapid and brief agitation to achieve rapid and even nearly instant cooling) into approximately 9 parts by weight of OMS fuel at room temperature.

In this particular example, this immediate 10-fold dilution causes almost instant cooling and in situ precipitation of the monoglycerides as very small particulate material. Using a phase contrast microscope for visualization at 150-600× magnification, Applicant has observed that the rapid precipitation of monoglycerides in mineral spirits or paraffin oil at a final concentration of 3-5% by weight, for example, produces a heterogeneous immobilized array of very small amorphous particles and crystals estimated to average approximately 1-2 microns in diameter. While occasional larger optically refractive crystals, e.g., 10-50 microns, are also present, these are not predominant. The precipitated particles appear substantially interlocked with one another, and immobile when viewed at these magnifications, and are surprisingly effective in sequestering and thickening large amounts of hydrophobic fuel such as OMS, mineral oils, etc.

The fuel compositions described herein can be produced in a number of different methods, including industrial scale methods, in various embodiments of the invention. For example, a continuous-flow process suitable for commercial scale production of thickened lighter fluid may be used under some conditions to achieve essentially instant precipitation of an agent such as a monoglyceride agent in OMS and/or other liquids, liquid fuels or flammable liquids, etc., as is discussed herein. Certain implementations of the process employ two metered streams of liquid. As an illustrative non-limiting example, one liquid stream may carry a ten-fold concentrated solution of heated monoglyceride (e.g., 30%-50% by weight Myverol™ 18-04 dissolved in 50%-70% by weight OMS at approximately 70° C.) delivered at a flow rate of n liters per minute (where n is any number). The second stream may carry OMS at ambient temperature (e.g., about 20° C.) at a 9-fold greater flow rate, i.e., 9n liters per minute. Other flow rates may also be used in other embodiments, e.g., at a 8-fold or 10-fold greater flow rate. In addition, other liquid fuels may be used as well in some cases, instead of or in addition to OMS.

The two streams may be brought together in a mixing chamber of sufficient but not excessive volume, fitted with an agitator that provides mixing of the two streams. The temperature of mixing may be, for example, approximately 25° C. (e.g., based upon the respective temperatures and volumes of the input streams). This mixing may be used to ensure essentially instant precipitation of the monoglyceride in the form of small microparticles for thickening of the OMS (or other liquid fuel).

As another non-limiting example, mixing can be accomplished using one or more mixing eductors or mixing nozzles. Such mixing eductors or nozzles can be designed in various ways, some of which can be regarded as belonging to one of two general categories, internal mixing and external mixing. External mixing eductors or nozzles are typically used with a tank or similar container. A fluid stream may be fed through the device such that mixing with bulk material occurs after the fluid exits the device. For internal mixing eductors or nozzles, two fluid streams are fed into the device. The larger, or primary, stream is typically fed under pressure, while usually the smaller or secondary stream may be pulled into the mixer, e.g., as a low pressure area is created within the device due to the flow of the primary stream, although the second stream may be pumped in some cases. The structure downstream of the fluid junction zone imparts fluid mixing before the combined fluid exits the device.

Where a mixing chamber is used, the thickened OMS (or other liquid or liquid fuel as discussed herein) may be pumped or otherwise transported from the mixing chamber, for instance, to a holding tank or directly to a filling line where the product is packaged in consumer retail containers. For internal mixing eductors or nozzles, the mixed fluid may be passed, for instance, through an intermediate mixing tank to ensure homogeneity, directed into a holding tank, or sent directly to a filling line.

For consumer convenience and ease of use, it is helpful to utilize an appropriately sized container (e.g., 1 quart capacity container) in various aspects of the invention. One example of a convenient container has sufficiently flexible walls and suitably configured and arranged dispensing hole(s) that allow the fuel composition to be dispensed by squeezing the walls of the container. For example, the fuel composition may be dispensed onto charcoal, a wood surface, or any other fuel described herein, e.g., solid fuels.

A number of thickening agents for hydrocarbon liquids are described, for example, by Cohen, et al. in U.S. Pat. No. 4,012,205. Soaps, waxes, various polymers, sterols and other agents such as fumed silica have been used as thickeners for hydrocarbon liquids. For military use, gasoline has been thickened and gelled by addition of benzene and polystyrene to form napalm B. However, when compared with the present use of monoglycerides that are edible, environmentally sustainable, easy to use, and/or inexpensive, many of the previously described agents have the disadvantages of being either more difficult to utilize, more costly, or employ ingredients that produce greater pollution when burned in air.

While not wishing to be bound by theory, Applicant believes that in a hydrophobic liquid fuel environment substantially lacking in water, such as OMS or other liquid fuels described herein, monoglyceride molecules (or similarly with other agents, e.g., diglycerides, fatty acids, etc.) in an agent may establish an atypical or "inverted" structural array of molecules when compared to their normal orientation. For example, with respect to monoglyceride molecules, it is believed that the glyceryl hydroxyl groups normally face outward into a mixed hydrophilic-hydrophobic environment such as a water-in-oil emulsion. With the inverted structure however, the two free hydroxyl groups in each monoglyceride molecule would form inwardly oriented hydrogen bonding bridges linked to other hydroxyl groups on neighboring monoglyceride molecules. This inward hydroxyl bridge configuration would allow the hydrophobic alkane-like fatty acid tails of the monoglyceride to extend outward into the hydrophobic fuel, enabling these tails to trap and thereby thicken molecules of the fuel, e.g., alkane molecules.

Consistent with this proposed mechanism, while not being bound by theory, Applicant has observed that when concentrated monoglycerides are predissolved in heated OMS (e.g., 40% by weight Myverol™ 18-04 dissolved in OMS at 70° C.) and then rapidly dispersed into cool OMS, the OMS solution immediately thickens with ultra-fine precipitated microparticles. However, when simple Myverol™ 18-04 is melted at 70° C. and then rapidly dispersed into cool OMS, large crystals of monoglyceride are precipitated that show little thickening ability. Applicant believes that monoglyceride molecules undergo inversion (fatty acids facing outward) when heated and dissolved in OMS solvent, and maintain this orientation that provides thickening when precipitated. On the other hand, Applicant believes that when pure monoglycerides are heated, melted and then rapidly precipitated while being dispersed in cool OMS, the molecules are unable to flip their original molecular orientation (fatty acids facing inward) and are therefore unable to efficiently thicken a hydrophobic liquid such as OMS. It is also believed that a similar mechanism would be present with other agents discussed herein, e.g., with respect to diglycerides, fatty acids, etc.

In this non-limiting example, two burn tests were conducted using OMS (Kingsford Products) that had been thickened with Myverol™ 18-04 according to the methods described herein, in which a 40% by weight solution of Myverol™ 18-04 dissolved in OMS at approximately 65° C. to 75° C. was diluted 10-fold with high speed dispersal into OMS at 20° C. to obtain a final concentration of 4% (w/w) of OMS composition. As shown here, this OMS composition may be a useful preparation for a commercial charcoal lighter consumer product. A 4 lb. quantity of Kingsford charcoal was ignited (80 briquettes, average weight of 22.5g each) as follows:

Forty briquettes (900 g=2.0 lbs.) were laid flat and arranged close to one another in a circle on the charcoal support grate of a Weber kettle style charcoal grill (Weber-Stephen Products Co., Palatine, Ill.), forming a first lower layer of charcoal. The OMS composition (2.5-3.0 g per briquette) was then applied to the upper surface of the briquettes in this lower layer (100-120 g thickened OMS, fluid density 0.8 g/cc, 125-150 cc total volume=4-5 fluid oz).

The OMS composition remained immobile and was only minimally absorbed into the surface of these briquettes. A second upper layer of 40 briquettes was added and arranged on top of the first layer. In one test, the upper layer of briquettes was oriented flat, and in the second test the briquettes were oriented more or less on edge (i.e., the briquettes' perimeter edge was vertically oriented). No OMS composition was added to this second upper layer of charcoal, so the upper layer remains uncoated. (Contact and transfer of some thickened fluid through contact between the upper and lower layers is not considered coating, and therefore the upper layer remains uncoated following such contact and transfer.) This "edge-up" second layer arrangement provided greater air space among the briquettes for increased air circulation during combustion. Remarkably, in both burn tests, within 10-13 minutes after igniting the OMS composition (placed only on the lower layer of briquettes), essentially all of the briquettes were at least 50% ash-covered and ready for grilling food. No residual odor of mineral spirits was detected.

When compared with unthickened conventional OMS fluid, the OMS composition of this particular example can advantageously remain substantially non-absorbed on the surface of the charcoal or other solid fuel. This condition allows ample time for adding and arranging the above-described upper layer of charcoal on top of the first lower layer of charcoal coated with the OMS composition. Other features and advantages present in some embodiments of the invention are as follows: Upon lighting the fuel composition at any point on the bottom layer of charcoal, the fire spread through the entire bed of charcoal. Charcoal briquettes are rapidly and easily ignited using the above-described two layer geometry because heat is beneficially generated and sustained between the lower and upper layers of charcoal.

Further, because flame and heat generated from combustion in the lower layer rises to the upper layer of charcoal briquettes, the entire charcoal lighting process occurred in this particular non-limiting example more efficiently and rapidly. The 10-13 minute interval between igniting the thickened OMS fuel and the charcoal being ready for grilling food is approximately one-half the normal time required for lighting charcoal by the conventional method (e.g., spraying unthickened OMS over a compact pre-formed mound of charcoal).

By comparison, when a conventional low viscosity OMS liquid is used according to directions, and is spray-applied/ squirted onto a mound of charcoal lumps or briquettes, very little of the total flame is being generated below the surface of the charcoal mound. Consequently, very little of the charcoal mass is being contacted or heated by the hotter portions of the flames, and charcoal lighting is slow and inefficient, typically requiring 30 minutes or more.

Based on the above example, Applicant also wished to determine whether the use of unmodified fluid OMS could be improved using a method of applying and burning the fuel similar to the new method described above. Accordingly, Applicant repeated the above-described method for igniting two layers of charcoal briquettes, in which the lower layer was soaked with unmodified OMS lighter fluid and the upper layer was not. To the best of Applicant's knowledge, selective application of lighter fluid to a lower layer of charcoal rather than to the upper outer layer runs contrary to commercial instructions. In fact, typical commercial instructions provided with OMS-type charcoal lighter fluids consistently teach the following (paraphrased from several commercial products):

Lighting instructions: Arrange charcoal briquettes in a pile or pyramid. Apply starter fluid over the pile of charcoal, use 1.6 fluid ounces (47 milliliters) per pound of charcoal. Light the charcoal immediately. The starter fluid will burn off cleanly in a few minutes leaving the charcoal fully ignited. When briquettes ash over, spread them out evenly and begin barbecuing.

In this example, and contrary to these instructions, forty closely spaced briquettes were laid flat and centered on a charcoal support grate of a Weber kettle style charcoal grill to form a lower layer of charcoal. The exposed upper surfaces of these briquettes were soaked with regular OMS fluid (2.5-3.0 g of OMS applied to the top of each briquette). Forty additional briquettes (without OMS) were placed on top of the OMS-treated briquettes to form an upper layer of charcoal. Most of the briquettes in this upper layer were arranged with their edges angled upward to provide air space/ventilation between neighboring briquettes. Approximately 3-4 minutes intervened between the time OMS was added to the lower layer of briquettes and the time of igniting the charcoal, during which the uncoated briquettes were placed on top of the OMS-soaked briquettes. Upon lighting the briquettes the flames soon propagated across the entire bed of charcoal.

Surprisingly, within ten minutes, approximately 75% of the surface area of the briquettes was ash-covered and the charcoal was ready for grilling food. This time between lighting the fire and the charcoal being ready for grilling was similar to the time measured using the Myverol-thickened OMS. This two-layer method in which only the lower (bottom) layer of charcoal receives lighter fluid appears to be effective in minimizing the time between igniting the charcoal lighter and grilling food. The single upper layer of charcoal briquettes is also effective in capturing much of the heat generated from the lower layer while still allowing enough air ventilation to support combustion. Thus, this method is a useful method for achieving rapid lighting of charcoal. Moreover, this method is not limited to only OMS, but can be used for any other suitable fuel composition for lighting charcoal briquettes, or other solid fuels such as those discussed herein, including thickened or unthickened fuel compositions.

While the tests above focused on the use of OMS, other hydrophobic fuels can also be used in a similar manner, in other embodiments of the present invention. Thus, for example, in another embodiment, a thickened hydrophobic biofuel composition was produced using a monomethyl ester fatty acid liquid fuel (methyl decanoate, CAS Reg. No. 110-42-9, product designation CE-1095, P&G Chemicals, Inc., Cincinnati, Ohio). This fuel composition was modified by adding and thermo-precipitating a mixture of saturated fatty acid monoglyceride (Myverol™ 18-04, described above) and a palm stearin triglyceride (Revel A stearin, Loders Croklaan Inc., Channahon, Ill.). These ingredients were initially heat-solubilized at approximately 70° C. in the CE-1095 liquid as a five-fold concentrate containing approximately 20% by weight Myverol™ 18-04 and approximately 12% Revel A.

This heated concentrate was then diluted five-fold while being rapidly mixed with CE-1095 provided at ambient temperature to produce a final mixing temperature of 30° C. The rapid mixing and accompanying rapid drop in temperature may favor formation of small crystals. As a specific non-limiting example, the final concentration of monoglyceride at approximately 4% by weight and the stearin concentration at approximately 2.4% by weight may be used to produce a thick liquid that can remain stationary as a coating, or can flow slowly under mild pressure. The resulting fuel composition may, for example, be readily applied and/or be allowed to remain immobilized on a solid fuel, e.g., charcoal or fireplace wood.

Any suitable concentration of monoglyceride or other e.g., diglycerides, fatty acids, etc. can be used. In one set of embodiments, Myverol™ 18-04 monoglyceride concentrations added to fatty acid ester biofuels was between 2% and 8% by weight, while the stearin triglyceride range was between 1% and 4% by weight. Remarkably, the combined use (and possible co-crystallization) of monoglycerides with stearin triglycerides may be used in certain fuel compositions discussed herein, e.g., for monoalkyl ester fatty acid biofuels. However, in other embodiments, the crystallization of monoglycerides alone may also be used for certain fuel compositions described herein, e.g., as described herein.

As another particular, non-limiting example, to test the efficacy of the fuel composition described immediately above, four pounds of charcoal briquettes were ignited with this fuel using the same procedure described above for the OMS composition. Again, forty briquettes weighing 2.0 lbs. were placed flat and close together on the charcoal support grate to form a first lower layer of charcoal, and thickened CE-1095 fluid containing 4% by weight Myverol™ 18-04+2.4% by weight Revel A (2.5g per briquette) was applied to the upper surface of the briquettes in this lower layer (100g total thickened fluid). A second upper layer of 40 briquettes was added and arranged flat on top of the first layer without adding any more CE-1095 fuel. Within 12 minutes after igniting the fuel on the lower layer of charcoal, most of the briquettes were at least 50% ash-covered and ready for grilling food. No residual odor was detected.

The term "fuel composition" refers to a composition that is freely combustible in air once ignited by a flame source. Furthermore, in some cases, prior to modifying, e.g., with a thickening agent, the fuel may be liquid at room temperature and 1 atmosphere, and can be poured and/or pumped. After thickening, the fuel composition can at least partially liquefy during combustion.

The terms "combustible," "hydrocarbon," "aliphatic," "fatty acid," "alkyl ester," have conventional definitions. Thus, for example, a ten carbon fatty acid with an ester-linked methyl group is a decanoate methyl ester (or methyl decanoate which is a mono-alkyl ester fuel), while odorless mineral spirits (OMS) is an aliphatic hydrocarbon fuel. Both of these example fuels are highly combustible and accordingly ignite by flame contact.

The term "hydrophobic liquid" refers to a substance that is liquid at room temperature and 1 atmosphere, and that is immiscible with water, i.e., at least a portion of the liquid phase-separates when exposed to water under these conditions.

The term "saturated fatty acid monoglyceride" refers to a glycerol molecule in which the hydroxyl group on any one or more of the three carbon atoms has been replaced an ester-linked saturated fatty acid such as palmitic acid ($C_{16:0}$) or stearic acid ($C_{18:0}$).

The term "thermo-precipitated" as it relates to a fuel composition refers to an agent such as a monoglyceride in which the physical state of the agent is altered from soluble to insoluble via a decrease in the temperature of the fuel. For example, in the context of monoglyceride precipitation and thickening fuels, a rapid temperature decrease can be used under certain conditions to induce rapid precipitation of the monoglyceride, which can be used to thicken a fuel. The monoglyceride may be easily heated (e.g., to 70° C.) and/or dissolved in a portion, e.g., at least a small portion, e.g., 10% by weight, of the hydrophobic liquid used in the fuel composition. The heated and dissolved monoglyceride may be rapidly blended, dispersed and/or cooled with the remaining bulk, e.g., 90% by weight, of the hydrophobic liquid retained at room temperature, which may result in thickening of the fuel composition. It should be recognized the monoglyceride or monoglyceride agent may precipitate in some embodiments over a temperature range rather than at one specific temperature. In some cases, rapid cooling may assist in precipitating multiple components in a monoglyceride agent together.

As used herein, terms such as "saturated fatty acid monoglyceride," "saturated monoglyceride" and "monoglyceride" are all used to refer to molecules in which one saturated fatty acid is chemically ester-linked to one of the glycerol moiety's carbon atoms Similarly, the terms "disaturated diglycerides" and "trisaturated triglycerides" refer to glycerol molecules in which, respectively, either two or three saturated fatty acid molecules are chemically ester-linked to either two or three of the glycerol's carbon atoms. An agent may include, for example, monoglycerides, diglycerides, and/or triglcerides, and/or other components as those discussed herein.

The term "saturated fatty acid monoglyceride agent" and similar terms referring to agents used in various embodiments generally refers to a preparation or set of preparations which are combined in the hydrophobic fuel. The agent may contain, for example, saturated fatty acid monoglycerides, and/or di-and/or tri-glycerides. Other components may also be present in the agent. In some embodiments, a variety of components may be present within the agent that do not excessively interfere with the thickening function of the agent. In some cases in which the agent comprises multiple components, the various components may be combined, e.g., prior to adding and/or thermoprecipitating the agent in the hydrophobic liquid. However, this is not essential; in other cases, for example, different components may be added separately to form a solution with a portion of the hydrophobic liquid, and/or may be added to separate portions of hydrophobic liquid to form separate solutions, each of which may be added to and thermoprecipitated in the cool hydrophobic liquid. The portions may be small in some cases. In cases where multiple agent component solutions are added to the cool hydrophobic liquid, in some embodiments, the additions are essentially simultaneous.

As used in connection with the present combustible hydrophobic liquids, the terms "thickened" and "thickening" refer to a significant increase in viscosity. For example, the viscosity may be increased such that the thickened liquid does not flow as a thin liquid at 20° C. The thickening may, for example, result in a fuel having a "syrupy" degree of viscosity or may be thicker, e.g., substantially or fully gelled at 20° C. In this context, "gelled" means the thickened material does not appreciably flow when a 2 cm cube is placed on a horizontal surface for 5 minutes at 20° C.

The terms "portion," "smaller portion," and "larger portion" as these terms are used herein, are meant to describe amounts and relative amounts by weight of fuel. More specifically, the term "portion" includes any suitable percentage, including both "small portions" (as little as 1% of an entire amount) and large portions (as much as 100% of an amount). A "larger portion" is defined as being at least two-fold greater in weight than a "small portion" or a "smaller portion." A "larger portion" may also be much greater than two-fold greater than the "smaller portion," e.g., it may be ten-fold greater, 20-fold greater or even more. Thus, a smaller portion of one part by weight of a fuel composition containing 60% by weight of dissolved monoglycerides may be diluted by combining with a 19-fold larger portion of cool fuel to produce 20 parts by weight of a combined fuel mixture containing 3% by weight of precipitated monoglycerides that thicken the fuel composition.

The term "ambient temperature" refers to the air temperature in the manufacturing facility that typically ranges from approximately 20° C. to 25° C.

The terms "unheated" and "essentially unheated" are used to describe liquid fuel that is being combined with a heated monoglyceride-containing fuel (the latter being typically heated to a temperature of greater than 60° C.). The terms refer to liquid fuel that is substantially cooler than the heated fuel. More specifically, these terms are meant to include a broad range of cooler temperatures ranging from refrigerated temperatures (that may be as low as 0° C.) to temperatures as high as 40° C. For reasons of economy and energy conservation, unheated and essentially unheated temperatures are often at ambient temperatures, typically in the range of 20-25° C.

As used in connection with this invention, the term "charcoal" refers to charcoal in relatively large chunks, e.g., either or both irregular or unshaped lump charcoal and shaped briquette-style charcoal. Unless unshaped lump charcoal is specifically excluded, use of the term "charcoal briquettes" may include both shaped briquettes and the unshaped lump charcoal. Similarly, unless shaped briquette charcoal is specifically excluded, use of the term "lump charcoal" includes both shaped briquettes and the unshaped lump charcoal.

The term "ash-covered" refers to a bed of charcoal whose exposed surface is at least 50% covered with ash produced by the ignited surface.

The phrase and terms contained herein for methods of lighting charcoal describe "applying the fuel composition to a first lower layer of charcoal resting on a non-combustible support grate in a barbecue grill." This phrase refers to either a thickened or unthickened hydrocarbon or alkyl ester-based hydrophobic fuel that is sprayed or otherwise dispensed onto the exposed upward-facing surfaces of a layer of charcoal briquettes or lumps placed side-by-side on a typical metal grate that supports charcoal in a grill. This initial layer of charcoal constituting the so-called "first lower layer" is distinguished from the "second upper layer" of charcoal (in most cases an amount roughly similar to the first lower layer). The second upper layer is placed on top of the first lower layer, and does not necessarily require addition of any more lighter fuel. The charcoal "support grate" must allow ample air circulation around the charcoal to support combustion.

The phrase and terms contained herein for methods of lighting charcoal describe "lighting charcoal and reducing the time required for the charcoal to become ash-covered and ready for grilling food." The prior art methods that utilize conventional OMS lighter fluid that is applied to the outer surface of a typical 4 pound mound of charcoal require at least 20 minutes combustion time for the charcoal to become ash-covered and ready for grilling food.

All patents and other references cited in the specification are indicative of the level of skill of those skilled in the art to which the invention pertains, and are incorporated by reference in their entireties, including any tables and figures, to the same extent as if each reference had been incorporated by reference in its entirety individually.

One skilled in the art would readily appreciate that the present invention is well adapted to obtain the ends and advantages mentioned, as well as those inherent therein. The methods, variances, and compositions described herein as presently representative of preferred embodiments are exemplary and are not intended as limitations on the scope of the invention. Changes therein and other uses will occur to those skilled in the art, which are encompassed within the spirit of the invention, are defined by the scope of the claims.

It will be readily apparent to one skilled in the art that varying substitutions and modifications may be made to the invention disclosed herein without departing from the scope and spirit of the invention. For example, variations can be made in the particular choice of monoglyceride(s) in the claimed composition, source and selection of other thickening or crystallization stabilizing agents such as stearin triglycerides that may be combined with monoglycerides, method of combining and/or diluting ingredients in the claimed composition and the like. Furthermore, it will be recognized that other components may be added to the fuel compositions for particular applications. For example, masking fragrances that alter the overall odor of the fuel compositions may be advantageously added to the above-described compositions. Such additions and variations are within the scope of the claims of the present invention. Thus, such additional embodiments are within the scope of the present invention and the following claims. It will be readily apparent to one skilled in the art that varying substitutions and modifications may be made to the invention disclosed herein without departing from the scope and spirit of the invention.

The invention illustratively described herein suitably may be practiced in the absence of any element or elements, limitation or limitations which is not specifically disclosed herein. Thus, for example, in each instance herein any of the terms "comprising," "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values or value range endpoints are provided for embodiments, additional embodiments are described by taking any 2 different values as the endpoints of a range or by taking two different range endpoints from specified ranges as the endpoints of an additional range. Such ranges are also within the scope of the described invention. Further, specification of a numerical range including values greater than one includes specific description of each integer value within that range.

Thus, additional embodiments are within the scope of the invention and within the following claims.

What is claimed is:

1. A fuel composition comprising at least one hydrophobic liquid fuel and between 2% and 6% by weight of at least one saturated fatty acid monoglyceride agent, wherein said monoglyceride agent has been precipitated in said hydrophobic liquid fuel resulting in thickening of said hydrophobic liquid fuel.

2. The composition of claim 1, wherein said monoglyceride agent has been heated and dissolved with at least a portion of said hydrophobic liquid fuel before being cooled and precipitated in said composition.

3. The composition of claim 1, wherein said hydrophobic liquid fuel is a hydrocarbon- or fatty acid ester-based hydrophobic liquid.

4. The composition of claim 1, wherein said hydrophobic liquid fuel comprises an aliphatic hydrocarbon liquid.

5. The composition of claim 4, wherein said aliphatic hydrocarbon liquid is selected from the group consisting of odorless mineral spirits and paraffin oils.

6. The composition of claim 1, wherein said hydrophobic liquid fuel comprises a fatty acid alkyl ester liquid.

7. The composition of claim 1, wherein at least 50% by weight of said monoglyceride agent comprises glyceryl monostearate or glyceryl monopalmitate, or a mixture of glyceryl monostearate and glyceryl monopalmitate.

8. The composition of claim 1, further comprising between 1% and 10% by weight of at least one saturated fatty acid-containing diglyceride.

9. The composition of claim 1, further comprising between 1% and 10% by weight of a fat that is solid at room temperature and comprising at least one trisaturated triglyceride.

* * * * *